(12) United States Patent
Kurtsman

(10) Patent No.: US 6,202,570 B1
(45) Date of Patent: Mar. 20, 2001

(54) COMMUNICATIONS EQUIPMENT RELAY RACK

(75) Inventor: Yakov Kurtsman, Chicago, IL (US)

(73) Assignee: Homaco, Inc., Chicago, IL (US)

( * ) Notice: Subject to any disclaimer, the term of this patent is extended or adjusted under 35 U.S.C. 154(b) by 0 days.

(21) Appl. No.: 09/465,328

(22) Filed: Dec. 17, 1999

(51) Int. Cl.[7] .................................................. A47B 57/30
(52) U.S. Cl. .......................................... 108/108; 211/187
(58) Field of Search ............................ 108/13, 108, 107, 108/109, 147.11, 147.16, 147.17; 248/222.41, 241, 243; 211/26, 26.2, 187

(56) References Cited

U.S. PATENT DOCUMENTS

| | | |
|---|---|---|
| 2,604,213 | 7/1952 | Bales et al. . |
| 2,920,244 * | 1/1960 | Miksit et al. ..................... 211/26 X |
| 2,932,409 * | 4/1960 | Wineman ......................... 211/187 X |
| 3,392,848 | 7/1968 | McConnell et al. . |
| 3,592,345 * | 7/1971 | Featherman ..................... 211/187 X |
| 3,612,290 * | 10/1971 | Evans ............................... 211/187 X |
| 4,106,630 | 8/1978 | Rosenband . |
| 4,203,373 * | 5/1980 | Conti ................................ 108/108 X |
| 4,258,464 | 3/1981 | Ullman, Jr. . |
| 4,592,286 * | 6/1986 | Trubiano .......................... 211/187 X |
| 4,778,067 * | 10/1988 | Bellerose ............................ 211/187 |
| 4,938,442 | 7/1990 | Mastrodicasa . |
| 5,025,937 | 6/1991 | King . |
| 5,127,340 | 7/1992 | Maro et al. . |
| 5,566,836 | 10/1996 | Lerman . |
| 5,624,045 | 4/1997 | Highsmith et al. . |

* cited by examiner

Primary Examiner—Jose V. Chen
Assistant Examiner—Michael J. Fisher
(74) Attorney, Agent, or Firm—Anthony S. Zummer

(57) ABSTRACT

An improved communications equipment relay rack includes a pair of parallel elongated columns. The columns are held upright. A mounting ear is secured to each upright column. The mounting ears are at substantially the same level in a horizontal plane extending through the ears. A support peg is fixed to each mounting ear. Each of the support pegs extends toward the other support peg. A shelf is mounted between the upright columns. The shelf includes a floor having a pair of opposed edges. A mounting side is secured to each of the opposed edges. Each mounting side is substantially perpendicular to the floor. Each of the mounting sides has a shelf mounting aperture receiving a support peg to hold the shelf between the columns.

7 Claims, 3 Drawing Sheets

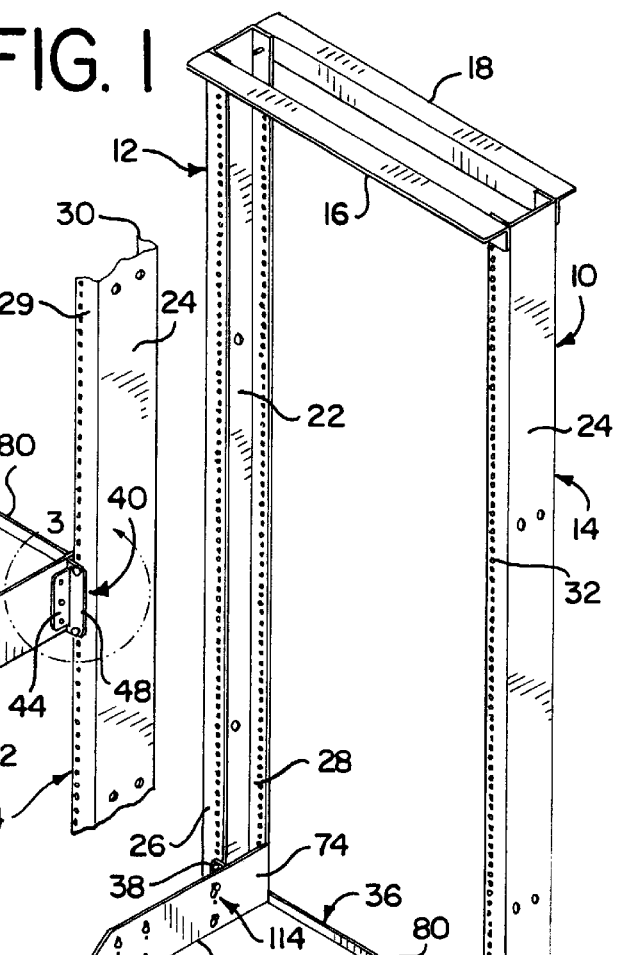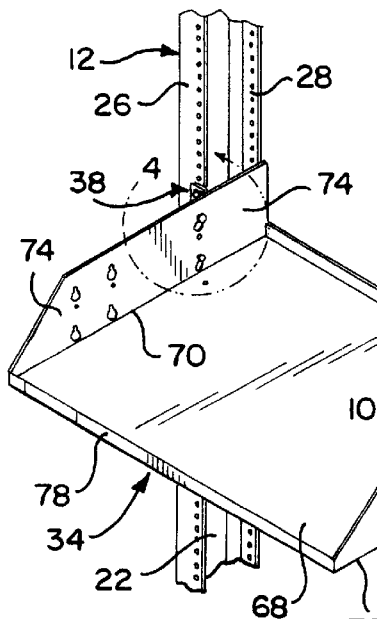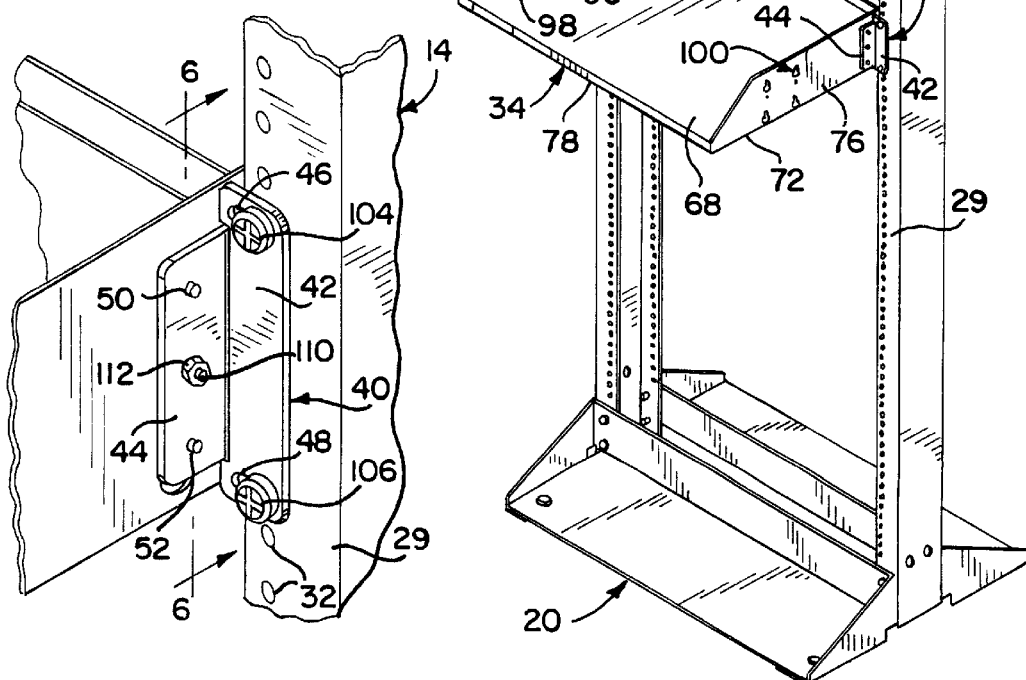

COMMUNICATIONS EQUIPMENT RELAY RACK

BACKGROUND OF THE INVENTION

Communications installations utilize relay racks for a variety of purposes. One of such purposes is to support auxiliary equipment. To this end, it is often desirable to provide a shelf on a relay rack to receive and support a variety of types of equipment. The space requirements in a communications installation demand that space be optimized. In addition, it is desirable for a shelf on a relay rack to be easily mounted on the relay rack and securely positioned. It is also desirable to provide a shelf for use on a relay rack which may be installed by a single individual to make the installation of the shelf efficient. Furthermore, a relay rack with a shelf must have a high degree of stability.

BRIEF SUMMARY OF THE INVENTION

The subject communications equipment relay rack comprises a pair of spaced apart parallel upright columns. A mounting ear is secured to each upright column at a selected height on the respective column. Each mounting ear is in the same horizontal plane as the other mounting ear. A support peg is fixed to each mounting ear. Each of the support pegs extends toward the support peg of the other mounting ear. A shelf is mounted between the spaced apart upright columns. The shelf includes a floor having a pair of opposed edges. A mounting side is secured to each of the opposed edges of the floor. Each mounting side is substantially perpendicular to the floor. Each of the mounting sides has a shelf mounting aperture receiving a respective support peg to hold the shelf between the columns.

BRIEF DESCRIPTION OF THE DRAWINGS

FIG. 1 is a perspective view of a communications equipment relay rack having a shelf assembly mounted thereon which is a specific embodiment of the instant invention;

FIG. 2 is an enlarged perspective view of the shelf assembly mounted on column own in FIG. 1;

FIG. 3 is an enlarged perspective view identified by numeral 3 in FIG. 2 showing a mounting ear attached to a column;

DETAILED DESCRIPTION OF THE INVENTION

Figure 4:
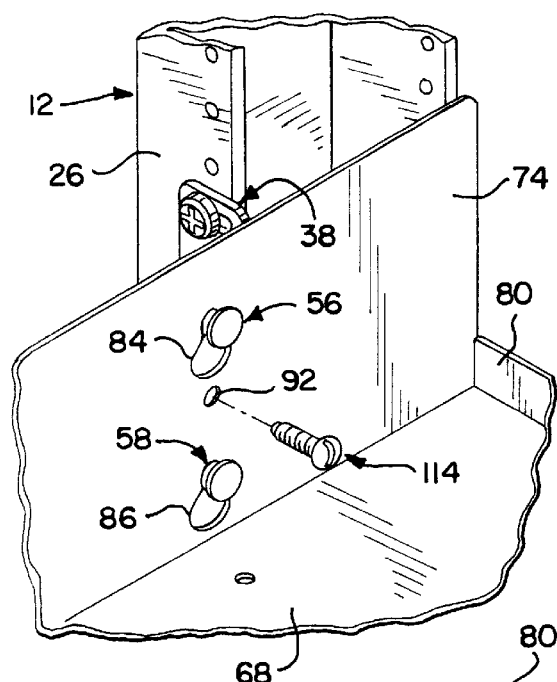
FIG. 4 is an enlarged perspective view identified by numeral 4 in FIG. 2, but shown with a bolt in an exploded view.
Figure 6:
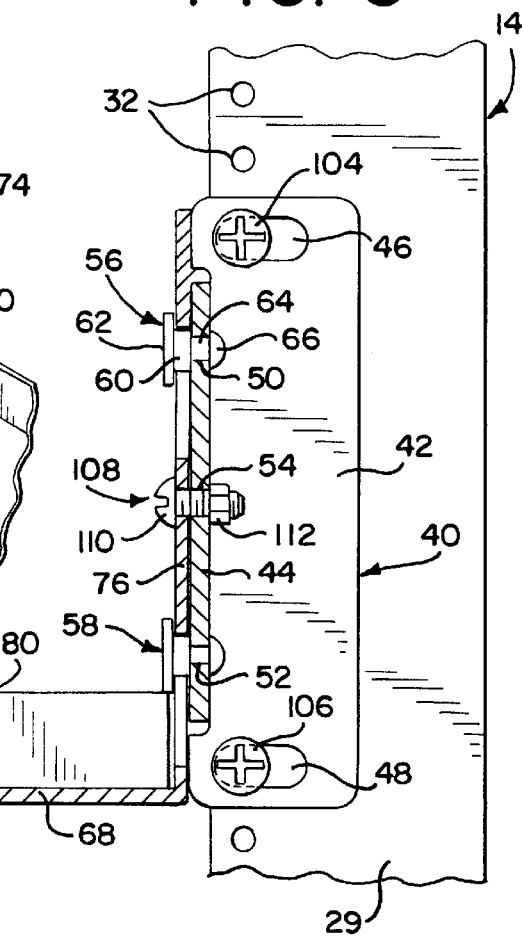
FIG. 6 is a cross sectional view taken on Line 6—6 of FIG. 3.

Referring now to the drawings, and especially to FIG. 1, a communications equipment relate rack embodying the herein disclosed invention is generally indicated by numeral 10. The construction of a communications relay rack is generally well known. An example of a well-known construction of a relay rack is disclosed in U.S. Pat. No. 5,566,836, entitled, "Telecommunications Relay Rack" issued Oct. 22, 1996, to Zev Z. Lerman. Relay rack 10 includes a pair of identical elongated parallel columns 12 and 14, which are in an upright attitude. The upper ends of the columns are connected by top bars 16 and 18 in a conventional and well-known manner. The columns are held upright relative to a conventional and well-known horizontal supporting surface, such as, a floor by a well-known base 20.

Columns 12 and 14 include webs 22 and 24, respectively. Web 22 has a pair of sides 26 and 28 formed integral with opposed edges. Web 24 has a pair of opposed sides 29 and 30 formed integral with opposed edges. Each of the sides has a plurality of conventional columnar threaded mounting holes 32 extending along the length of the side for receiving and holding a conventional columnar mounting threaded fastener. As may be seen in FIG. 1, a shelf assembly 34 is mounted on columns 12 and 14 at sides 26 and 29. The shelf assembly includes a relay rack shelf 36 and mounting ears 38 and 40. Mounting ears 38 and 40 of the shelf assembly are releasably connected to sides 26 and 29, respectively. Each of the mounting ears 38 and 40 has an identical construction to the other mounting ear.

As may be seen in FIG. 3, mounting ear 40 includes an upright bracket 42. A shelf shoulder 44 is formed integral with the bracket and is substantially perpendicular to the bracket. The upright bracket has an upper slotted aperture 46 and a lower slotted aperture 48. The slotted apertures 46 and 48 are parallel to each other and are spaced apart a distance to be alignable with a pair of selected threaded mounting holes 32 on the columns.

The shelf shoulder includes a pair of spaced apart peg apertures 50 and 52. A lock receptacle 54 is positioned midway between peg apertures 50 and 52 and is aligned vertically between the peg apertures. Identical support pegs 56 and 58 are mounted in apertures 50 and 52, respectively. Each of the support pegs includes a peg body 60 with a head 62 formed integral with body 60. A shank 64 is formed integral with the body and extends in a direction opposite to the head. Each shank is mounted in its respective peg aperture. Each shank is upset to form a rivet head 66 to fix the support peg in its respective peg aperture of the shelf shoulder.

Shelf 36 includes a flat rectangular floor 68 which has a pair of opposed parallel edges 70 and 72. Mounting sides 74 and 76 are formed integral with opposed edges 70 and 72, respectively. The mounting sides are perpendicular to the floor. A front ridge 78 is formed integral with the floor perpendicular to the opposed edges and to the floor. A rear ridge 80 is formed integral with floor 68 parallel to front ridge 78 and perpendicular to the opposed edges and the floor. The ridges 78 and 80 provide rigidity to the flat floor.

Figure 5:
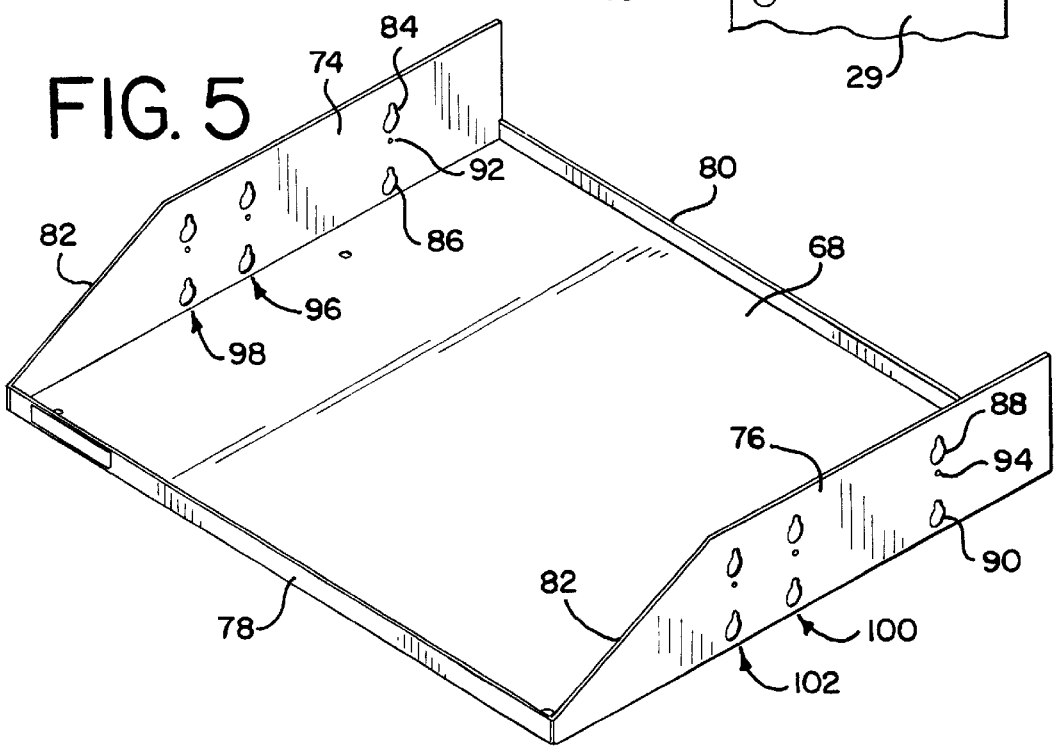
FIG. 5 is a perspective view of the shelf shown in FIGS. 1 and 2.

Each of the mounting sides 74 and 76 is a mirror image of the other mounting side. Each mounting side has a forward sloping edge 82. Each mounting side has a plurality of keyhole shelf mounting apertures formed therein. A pair of keyhole shelf mounting apertures 84 and 86 is formed in side 74 near rear ridge 80. A like pair of keyhole shelf mounting apertures 88 and 90 is formed in side 76, as may be seen in FIG. 5. Aperture 84 is positioned above second aperture 86 and aperture 88 is positioned above second aperture 90. A lock aperture 92 is positioned between apertures 84 and 86, and is vertically aligned with those apertures. A lock aperture 94 is formed in side 76 between apertures 88 and 90 and is vertically aligned with those apertures. The apertures 84 and 86, along with lock aperture 92, define a set of mounting apertures. Apertures 88 and 90, with lock aperture 94, define another set of mounting apertures. The two sets of mounting apertures are positioned opposite each other. Side 74 includes a second set of mounting apertures 96 and a third set of mounting apertures 98. Each of the two sets of mounting apertures 96 and 98 includes a pair of keyhole shelf mounting apertures and a lock aperture. In a like manner, mounting side 76 includes two additional sets of mounting apertures 100 and 102. Each of the sets of mounting apertures 100 and 102 includes a pair of keyhole shelf mounting apertures similar to apertures 88 and 90, and a lock aperture similar to lock aperture 94. The mounting aperture sets 96 and 100 are aligned opposite to each other. Mounting aperture sets 98 and 102 are also aligned opposite to each other.

Shelf assembly 34 may be easily mounted on the column of a relay rack by a single individual. Mounting ear 40 is mounted on side 29 of column 14. Ear 40 is easily positioned on the column by inserting a columnar fastener screw 104 through slotted aperture 46. Screw 104 is threadedly mounted in a selected threaded mounting hole. A second columnar fastener screw 106 is inserted through slotted aperture 48 and threadedly mounted in an appropriately aligned threaded mounting hole. The slotted apertures are perpendicular to the length of the column to allow sideways adjustment of ear 40 relative to column 14. Ear 38, in a like manner, is mounted on side 26 of column 12. Ear 38 is positioned at the same level as ear 40, so that there is a uniformity of height of the mounting ears such that the mounting ears are in a horizontal plane extending through the ears.

Shelf 36 is mounted on the ears 38 and 40. Side 76 has its keyhole mounting apertures 88 and 90 in receipt of support pegs 56 and 58, respectively. In a like manner, the side 74 is mounted on ear 38. As is conventional, each of the pegs fits snuggly into the smaller portion of its respective keyhole mounting aperture, so that lock aperture 94 is aligned with lock receptacle 54. A lock fastener 108 is mounted in the aligned lock aperture 94 and lock receptacle 54. Lock fastener 108 is a conventional bolt 110 with a conventional nut 112 mounted on the bolt to lock the lock fastener into place to secure the pegs in the respective mounting apertures. In a like manner, a lock fastener 114 identical to lock fastener 108 is mounted in side 74 and ear 38 to secure side 74 to ear 38. The lock fasteners secure shelf 36 to the ears, so that the shelf may not be accidentally disengaged from the ears, whether it be struck by an outside force or vibrated by an earthquake. Fasteners 104 and 106 are tightened to lock the ears to the respective columns once the shelf is mounted on the ears. The mounting of the shelf assembly on the columns may be effected by a single workman, thereby improving the efficiency of the mounting of the shelf.

The instant shelf is shown with three sets of mounting apertures on each side, so that the position of the shelf relative to the columns may be adjusted. Irrespective of the position of the shelf relative to the columns, the lock fasteners secure the shelf to the ears and thus to the column.

Figure 7:
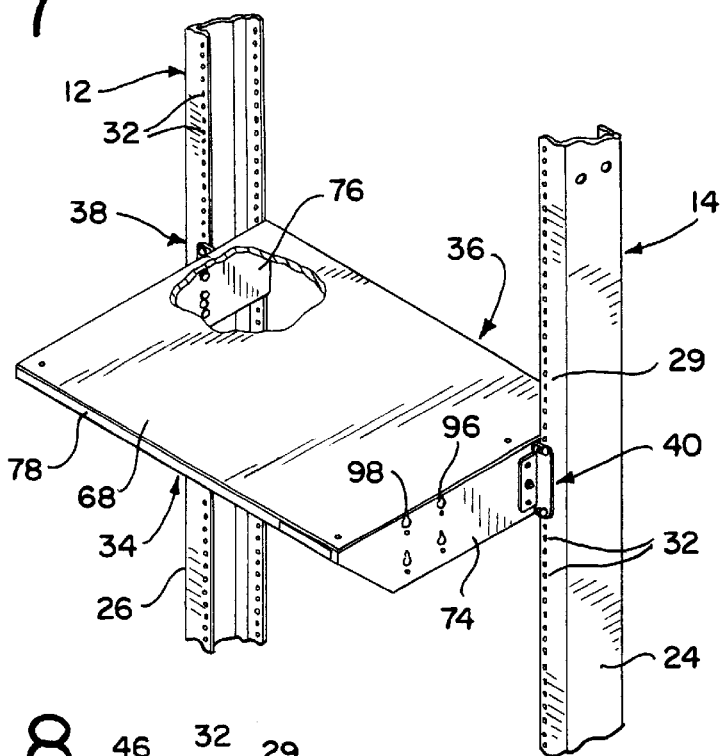
FIG. 7 is an enlarged perspective view of a shelf mounted between a pair of upright columns with the shelf being inverted relative to the attitude of the shelf as shown in FIGS. 1 and 2.
Figure 8:
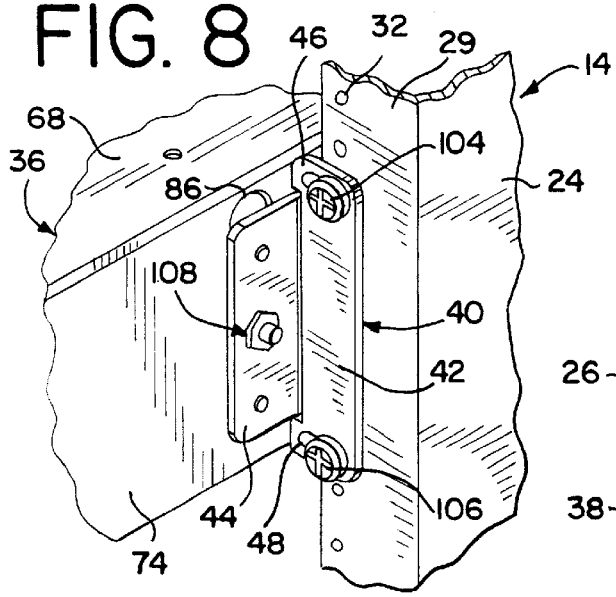
FIG. 8 is an enlarged perspective view showing a mounting ear with the shelf attached to the mounting ear and the ear secured to a column as shown in FIG. 7.
Figure 9:
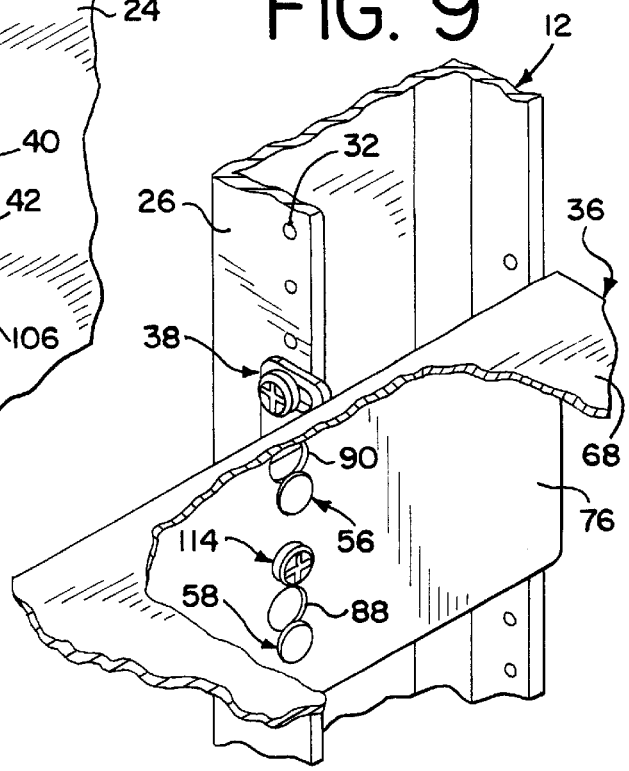
FIG. 9 is an enlarged perspective view with a portion of the shelf broken away with the shelf mounted on an ear as shown in FIG. 7.

In certain instances, it is desirable to provide a shelf which has no ridges to accommodate a particular large piece of equipment. Looking now to FIGS. 7, 8, and 9, it may be seen how shelf 36 may be inverted so that there is a flat floor to receive a price of equipment. The ears 38 and 40 are mounted on the column as described above. The shelf is mounted on the ears with the mounting sides extending downward, as viewed in FIG. 9. The lock fasteners are inserted in the respective lock apertures and lock receptacles for the respective sides and ears to lock the shelves into position. As may be seen in FIG. 9, the support pegs are positioned in the narrow portion of each of the keyhole mounting apertures. The lock fastener provides the vertical stability of the shelf. The positioning of the support pegs in the narrow portion of the mounting aperture provides a stability for the shelf. It may be appreciated that loading of a piece of equipment on the shelf may create a rotational moment about the lock fastener. However, the positioning of the support pegs in the narrow portion of the keyhole apertures provides for a snug fit and a tight connection to the ears so that a solid platform is created by the inverted shelf.

The construction of the present shelf assembly is such that whether the shelf be mounted with the sides extending upward or downward, the shelf may be installed by a single workman. Irrespective of whether the shelf is in the attitude shown in FIGS. 1 and 2, or in FIGS. 7, 8, and 9, the ears may be readily installed by a single workman, and the shelf mounted on the ears by that same single workman.

Although a specific embodiment of the herein disclosed invention has been shown in the accompanying drawings and described in detail above, it is to be expressly understood that the instant invention is limited only by the appended claims.

What is claimed is:

1. A communications equipment relay rack comprising, in combination, a pair of spaced apart parallel elongated columns in a substantially upright attitude, a mounting ear secured to each upright column at a selected position on the respective column, said mounting ears being at substantially the same level in a horizontal plane extending through said ears, a support peg fixed to each mounting ear, each of said support pegs extending toward the other support peg, a shelf mounted between the spaced apart upright columns, said shelf including a floor having a pair of opposed edges, a mounting side secured to each of the opposed edges of the floor substantially perpendicular to the floor, each of said mounting sides having a shelf mounting aperture receiving a respective support peg of said support pegs to hold the shelf between the columns, a second support peg fixed to each mounting ear and being spaced from the first-mentioned support peg to form a pair of support pegs, and each of said mounting sides having a second shelf mounting aperture spaced from the first-mentioned shelf mounting aperture to form a pair of shelf mounting apertures, each of said shelf mounting apertures is a key hole aperture, each column has a plurality of columnar mounting holes arranged longitudinally along its length, each of said mounting ears has an upright bracket, each upright bracket has a pair of slotted apertures aligned with a pair of respective columnar mounting holes, a columnar fastener positioned in each slotted aperture and mounted in the respective columnar mounting hole to secure the mounting ear to its respective upright column, a shelf shoulder fixed to and substantially perpendicular to each upright bracket, and each pair of support pegs fixed to each shelf shoulder for positioning in said pair of key hole apertures of a respective mounting side of said mounting sides.

2. A communications equipment relay rack comprising, in combination, a pair of spaced apart parallel elongated columns in a substantially upright attitude, a mounting ear secured to each upright column at a selected position on the respective column, said mounting ears being at substantially the same level in a horizontal plane extending through said ears, a support peg fixed to each mounting ear, each of said support pegs extending toward the other support peg, a shelf mounted between the spaced apart upright columns, said shelf including a floor having a pair of opposed edges, a mounting side secured to each of the opposed edges of the floor substantially perpendicular to the floor, each of said mounting sides having a shelf mounting aperture receiving a respective support peg of said support pegs to hold the shelf between the columns, a second support peg fixed to each mounting ear and being spaced from the first-mentioned support peg to form a pair of support pegs, and each of said mounting sides having a second shelf mounting aperture spaced from the first-mentioned shelf mounting aperture to form a pair of shelf mounting apertures, each of said columns has a plurality of columnar mounting holes arranged longitudinally along its length, each of said mounting ears has an upright bracket, each of said upright brackets has a pair of slotted apertures aligned with a pair of respective columnar mounting holes of its respective column, a columnar fastener mounted in each slotted aperture and secured in the respective columnar mounting hole to secure each of the mounting ears to the respective upright mounting column, a lock receptacle adjacent to one of the support pegs of each pair of support pegs, each mounting side having a lock aperture adjacent to one of the shelf mounting apertures of each pair of shelf mounting apertures, and a lock fastener extending through each lock aperture and the respective lock receptacle to secure the respective mounting side to its respective mounting ear.

3. A communications equipment relay rack comprising, in combination, a pair of spaced apart parallel elongated columns in a substantially upright attitude, a mounting ear secured to each upright column at a selected position on the respective column, said mounting ears being at substantially the same level in a horizontal plane extending through said ears, a support peg fixed to each mounting ear, each of said support pegs extending toward the other support peg, a shelf mounted between the spaced apart upright columns, said shelf including a floor having a pair of opposed edges, a mounting side secured to each of the opposed edges of the floor substantially perpendicular to the floor, each of said mounting sides having a shelf mounting aperture receiving a respective support peg of said support pegs to hold the shelf between the columns, a second support peg fixed to each mounting ear and being spaced from the first-mentioned support peg to form a pair of support pegs, and each of said mounting sides having a second shelf mounting aperture spaced from the first-mentioned shelf mounting aperture to form a pair of shelf mounting apertures, each of said spaced apart shelf mounting apertures is a key hole aperture, each of said columns has a plurality of columnar mounting holes arranged longitudinally along its length, each of said mounting ears has an upright bracket, each of said upright brackets has a pair of slotted apertures aligned with a pair of respective columnar mounting holes of its respective column, a columnar fastener in each slotted aperture and secured in a respective columnar mounting hole to secure the mounting ear to its respective upright column, a lock receptacle adjacent to one of the support pegs of each upright bracket, each mounting side having a lock aperture adjacent to one of the shelf mounting apertures of each pair of shelf mounting apertures, and a lock fastener extending through each lock aperture and the respective lock receptacle to lock the mounting side to its respective mounting ear.

4. A communications equipment relay rack comprising, in combination, a pair of spaced apart parallel elongated columns in a substantially upright attitude, a mounting ear secured to each upright column at a selected position on the respective column, said mounting ears being at substantially the same level in a horizontal plane extending through said ears, a support peg fixed to each mounting ear, each of said support pegs extending toward the other support peg, a shelf mounted between the spaced apart upright columns, said shelf including a floor having a pair of opposed edges, a mounting side secured to each of the opposed edges of the floor substantially perpendicular to the floor, each of said mounting sides having a shelf mounting aperture receiving a respective support peg of said support pegs to hold the shelf between the columns, a second support peg fixed to each mounting ear and being spaced from the first-mentioned support peg to form a pair of support pegs, and each of said mounting sides having a second shelf mounting aperture spaced from the first-mentioned shelf mounting aperture to form a pair of shelf mounting apertures, each of said columns has a plurality of columnar mounting holes arranged longitudinally along its length, each of said mounting ears has an upright bracket, each of said upright brackets has a pair of slotted apertures aligned with a pair of respective columnar mounting holes of its respective column, a columnar fastener in each slotted aperture and its respective columnar mounting hole to secure the mounting ear to its respective upright column, a shelf shoulder fixed to and substantially perpendicular to each upright bracket, each of said pair of support pegs fixed to the shelf shoulder of its respective mounting ear, a lock receptacle in each upright bracket adjacent to one of the support pegs of a respective pair of support pegs, each mounting side having a lock aperture adjacent to one of the shelf mounting apertures of each pair of shelf mounting apertures, each lock aperture aligned with its respective lock receptacle, and a lock fastener extending through each lock aperture and the respective lock receptacle to fix the mounting side to its respective mounting ear.

5. A communications equipment relay rack comprising, in combination, a pair of spaced apart parallel elongated columns in a substantially upright attitude, a mounting ear secured to each upright column at a selected position on the respective column, said mounting ears being at substantially the same level in a horizontal plane extending through said ears, a support peg fixed to each mounting ear, each of said support pegs extending toward the other support peg, a shelf mounted between the spaced apart upright columns, said shelf including a floor having a pair of opposed edges, a mounting side secured to each of the opposed edges of the floor substantially perpendicular to the floor, each of said mounting sides having a shelf mounting aperture receiving a respective support peg of said support pegs to hold the shelf between the columns, a second support peg fixed to each mounting ear and being spaced from the first-mentioned support peg to form a pair of support pegs, and each of said mounting sides having a second shelf mounting aperture spaced from the first-mentioned shelf mounting aperture to form a pair of shelf mounting apertures, each of said columns has a plurality of columnar mounting holes arranged longitudinally along its length, each of said mounting ears has an upright bracket, each upright bracket has a pair of slotted apertures aligned with a pair of respective columnar mounting holes of its respective column, each of said slotted apertures being substantially perpendicular to the respective column, a columnar fastener positioned in each slotted aperture and mounted in the respective columnar mounting hole to secure the respective mounting ear to the respective upright column, a shelf shoulder fixed to and substantially perpendicular to each upright bracket, each pair of support pegs fixed to the shelf shoulder of the respective mounting ear, each of said shelf mounting apertures being a key hole aperture for receiving a respective support peg of said support pegs, a lock receptacle in each shelf shoulder between the support pegs of the respective pair of support pegs, each mounting side having a lock aperture between the respective shelf mounting apertures, and a lock fastener extending through each lock aperture and the respective lock receptacle to lock each mounting side to its respective mounting ear.

6. A communications equipment relay rack comprising, in combination, a pair of spaced apart parallel elongated columns in a substantially upright attitude, a mounting ear secured to each upright column at a selected position on the respective column, said mounting ears being at substantially the same level in a horizontal plane extending through said ears, a support peg fixed to each mounting ear, each of said support pegs extending toward the other support peg, a shelf mounted between the spaced apart upright columns said shelf including a floor having a pair of opposed edges, a mounting side secured to each of the opposed edges of the floor substantially perpendicular to the floor, each of said mounting sides having a shelf mounting aperture receiving a respective support peg of said support pegs to hold the shelf between the columns each of said columns has a plurality of columnar mounting holes arranged longitudinally along its length, each of said mounting ears has an upright bracket, each of said upright brackets has a pair of slotted apertures aligned with a pair of columnar mounting holes of its respective column, a columnar fastener mounted in each slotted aperture to secure each mounting ear to its respective elongated column, a shelf shoulder fixed to and substantially perpendicular to each upright bracket, and each support peg fixed to the shelf shoulder of the respective mounting ear.

7. A communications equipment relay rack comprising, in combination, a pair of parallel spaced apart elongated columns, each of said columns has a plurality of columnar threaded mounting holes arranged longitudinally along its respective length, a base secured to the columns holding the columns in a substantially upright attitude, a mounting ear secured to each upright column, each mounting ear having an upright bracket, each upright bracket having a pair of parallel elongated slotted apertures alignable with a pair of respective columnar mounting holes, each of the slotted apertures having its length substantially perpendicular to the respective elongated column, a columnar fastener mounted in each slotted aperture and threadedly secured to a respective columnar mounting hole to secure each mounting ear to its respective column, a shelf shoulder formed integral with and substantially perpendicular to each upright bracket, a pair of support pegs mounted on each shelf shoulder, each of said support pegs being aligned in a vertical direction, each of said support pegs extending toward the other shelf shoulder, a shelf connected to the shelf shoulders, said shelf including a floor having a pair of substantially parallel edges, a mounting side secured to each of said parallel edges, each of said mounting sides having a pair of spaced apart key hole apertures receiving respective support pegs to hold the shelf between the columns, a lock receptacle in each shelf shoulder equidistantly spaced from between the respective support pegs, each of said mounting sides having a lock aperture between its respective key hole apertures aligned with the lock receptacle of the respective ear, a lock fastener mounted in each lock aperture and mounted in the respective lock receptacle to secure the mounting side to the respective mounting ear, a front ridge formed integral with an edge of the floor substantially perpendicular to the mounting sides, and a rear ridge formed integral with an edge of the floor spaced from the front ridge and substantially perpendicular to the mounting sides.

\* \* \* \* \*

UNITED STATES PATENT AND TRADEMARK OFFICE
CERTIFICATE OF CORRECTION

PATENT NO. : 6,202,570 B1
DATED : March 20, 2001
INVENTOR(S) : Yakov Kurtsman

It is certified that error appears in the above-identified patent and that said Letters Patent is hereby corrected as shown below:

<u>Column 1,</u>
Line 40, delete "own" and substitute therefor -- shown --.

Signed and Sealed this

Sixteenth Day of October, 2001

Attest:

*Attesting Officer*

NICHOLAS P. GODICI
*Acting Director of the United States Patent and Trademark Office*